(12) United States Patent
Meckstroth et al.

(10) Patent No.: US 7,229,374 B2
(45) Date of Patent: *Jun. 12, 2007

(54) DUAL FRICTION SURFACE ASYMMETRIC DAMPED TENSIONER

(75) Inventors: Richard J. Meckstroth, Vonore, TN (US); William K. Bowman, Springfield, MO (US); Steven J. Eck, Springfield, MO (US); Kevin G. Dutil, Springfield, MO (US); Earl E. McShane, Springfield, MO (US)

(73) Assignee: Dayco Products, LLC, Miamisburg, OH (US)

( * ) Notice: Subject to any disclaimer, the term of this patent is extended or adjusted under 35 U.S.C. 154(b) by 539 days.

This patent is subject to a terminal disclaimer.

(21) Appl. No.: 10/766,141

(22) Filed: Jan. 27, 2004

(65) Prior Publication Data

US 2004/0185976 A1 Sep. 23, 2004

Related U.S. Application Data (63) Continuation-in-part of application No. 10/029,442, filed on Dec. 20, 2001, now abandoned.

(51) Int. Cl.
 *F16H 7/12* (2006.01)
(52) U.S. Cl. .................................... 474/133
(58) Field of Classification Search ............ 474/101, 474/109, 111, 113, 115, 133, 135
 See application file for complete search history.

(56) References Cited

U.S. PATENT DOCUMENTS

| | | | |
|---|---|---|---|
| 4,270,906 A | 6/1981 | Kraft et al. |
| 4,464,147 A | 8/1984 | Foster |
| 4,557,709 A | 12/1985 | St. John |
| 4,596,538 A | 6/1986 | Henderson |
| 4,808,148 A | 2/1989 | Holtz |
| 4,822,322 A | 4/1989 | Martin et al. |
| 4,826,471 A | 5/1989 | Ushio |
| 4,832,666 A | 5/1989 | Henderson |
| 4,886,482 A | 12/1989 | Koschmieder et al. |
| 4,886,483 A | 12/1989 | Henderson |

(Continued)

FOREIGN PATENT DOCUMENTS

FR 1439272 4/1965

(Continued)

*Primary Examiner*—Vicky A. Johnson
(74) *Attorney, Agent, or Firm*—Joseph V. Tassone; Thompson Hine LLP (57) ABSTRACT

A belt tensioner for a power transmission belt is provided that utilizes asymmetric motion control and is operable in a first condition and a second condition. The belt tensioner has an arm with a belt engaging section and a drum section, a support member for securing the tensioner relative to the belt, and a spring that urges the arm to pivot about the support member in a first direction and urges the belt engaging section against the belt with a force to tension the belt. The tensioner also has a stator coupled to the support member to form arcuate spaces circumferentially spaced around the stator between the stator and the drum section and arcuate shaped wedges in the arcuate spaces. The tensioner further has a Belleville spring coupled to the arm for pivoting therewith and a friction device in sliding contact with the wedges and Belleville spring.

21 Claims, 4 Drawing Sheets

U.S. PATENT DOCUMENTS

| | | |
|---|---|---|
| 4,938,734 A | 7/1990 | Green et al. |
| 4,983,145 A | 1/1991 | Hirai et al. |
| 5,030,172 A | 7/1991 | Green et al. |
| 5,035,679 A | 7/1991 | Green et al. |
| 5,171,188 A | 12/1992 | Lardrot |
| 5,190,502 A | 3/1993 | Gardner et al. |
| 5,328,415 A | 7/1994 | Furutani et al. |
| 5,348,514 A | 9/1994 | Foley |
| 5,354,242 A | 10/1994 | St. John |
| 5,399,124 A | 3/1995 | Yamamoto et al. |
| 5,443,424 A | 8/1995 | Henderson |
| 5,470,280 A | 11/1995 | Ayukawa |
| 5,545,095 A | 8/1996 | Henderson |
| 5,718,649 A | 2/1998 | Hong et al. |
| 5,924,947 A | 7/1999 | Williams |
| 5,935,032 A | 8/1999 | Bral |
| 6,206,797 B1 * | 3/2001 | Quintus ...................... 474/135 |
| 6,231,465 B1 * | 5/2001 | Quintus ...................... 474/133 |
| 6,497,632 B2 | 12/2002 | Ayukawa et al. |
| 6,863,631 B2 * | 3/2005 | Meckstroth et al. ........ 474/135 |

FOREIGN PATENT DOCUMENTS

| | | |
|---|---|---|
| GB | 462044 | 5/1935 |
| JP | 05332409 A | 12/1993 |
| JP | 06137390 A | 5/1994 |
| JP | 06213296 A | 8/1994 |

* cited by examiner

DUAL FRICTION SURFACE ASYMMETRIC DAMPED TENSIONER

RELATED APPLICATION

This is a continuation-in-part of U.S. application Ser. No. 10/029,442, filed Dec. 20, 2001 now abandoned.

TECHNICAL FIELD

The present invention relates generally to tensioners for power transmission belts, and more particularly, to an asymmetrically damped tensioner having dual friction surfaces.

BACKGROUND

Many automobile engines currently on the market utilize an endless power transmission belt for driving a plurality of driven accessories. They employ a tensioning system utilized to provide a tensioning force on the endless power transmission belt, which may be of any suitable type known in the art. Preferably, the belt is made primarily of a polymeric material because the unique features of the tensioner of this invention readily permit the tensioner to tension a belt having a polyester load-carrying cord in an efficient manner.

In many of these automotive accessory drives it is necessary to provide a correct tension to control a tension ratio throughout the life of the belt. With the advent of the single belt V-ribbed drive system, this is of increasing importance since belts are longer and some accessories are driven off the backside of the belt as a flat belt drive. Automatic tensioners of various descriptions have been developed having the requisite characteristics enabling them to tune the belt system to remove input torsionals and prevent or reduce harmonics, while allowing the tensioner to respond to changes in the belt tension requirements. For instance, see U.S. Pat. Nos. 4,596,538, 4,832,666, and 5,443,424 to Henderson, U.S. Pat. Nos. 4,938,734, 5,030,172 and 5,035,679 to Green, et. al., U.S. Pat. No. 5,190,502 to Gardner, et. al., or U.S. Pat. No. 5,348,514 to Foley, all now incorporated into this application by this reference thereto. A problem is that a torsion spring cannot be made with a rate characteristic to both resiliently tension a belt and prevent bubble or slack length from developing in the belt during periods of extreme engine deceleration, i.e., that allows for asymmetric damping.

For optimal function of a V-ribbed, flat belt, or V belt tensioner, it is desirable that the tensioner move easily and quickly toward the belt to take up slack, but provide more than the same resistance to prevent the belt from lifting the tensioner arm away from the belt. This feature is desirable for proper control of steady state accessory torque loads that are occasionally interrupted with a non-steady state or reverse transient load, such as a wide-open-throttle (WOT) one-two gearshift in manual and automatic transmissions. During WOT, the engine suddenly goes from, for example, 5000 RPM to 3500 RPM, which is similar to putting a brake on the engine. The current tensioner then becomes an untensioner, which can cause belt slip because the tensioner will be lifted off the belt by the high tension in what is normally the low tension side of the system, allowing extra belt length to occur on the opposite side of the system.

Asymmetric damping is also desirable to control engine start up transients due to slow combustion events and rapid engine acceleration during first firing. Further, this motion is desirable to control torque pulses of engines having light-weight flywheels or "dual mass" flywheels, where the combustion torque variation can exceed levels equal to the average accessory torque load at idle at the crankshaft driver pulley.

It is known to have asymmetric motion control using hydraulic linkage with directional fluid orifices as in U.S. Pat. No. 5,924,947 to Williams and U.S. Pat. No. 4,822,322 to Martin et. al.

It is also known to have asymmetric motion control using dry or lubricated surface friction, such as a brake band, as in U.S. Pat. No. 5,354,242 to St. John. This system is limited, however, in its ability to provide asymmetric motion by the amount of angular vector shift with a change in rotational direction and that requires excessive rotational motion to tighten the band in the high torque direction.

As taught by U.S. Pat. No. 5,935,032 to Bral, it is also known to have asymmetric motion control using damping friction surfaces that are limited in friction torque developed by the amount of normal load that can be generated by a spring and that need lots of angular displacement to engage and disengage, where the displacement is amplified by a conical wedging action.

It is also known to have asymmetric motion control using an "elastomer sandwich" that is severely limited in range of operation by the very steep spring rates of the compressed elastomers as in U.S. Pat. No. 5,171,188 to Lardrot. The tensioner taught by Lardrot, however, suffers from a lack of angular rigidity since its center of pivot floats, and thus is not absolutely controlled, for instance see.

The present embodiments overcome these deficiencies and may accomplish the above-discussed functions for asymmetric motion control, and can be applied to any conventional rotating tensioner that uses a rotational spring to rotate the tensioner arm toward the belt to create belt tension.

SUMMARY

According to a first embodiment, a tensioner for a power transmission belt is provided. The tensioner comprises an arm having a belt engaging section and a drum section, a support member for securing the tensioner relative to the belt, and a spring that urges the arm to pivot about the support member in a first direction and urges the belt engaging section against the belt with a force to tension the belt. The tensioner also has a stator coupled to the support member to form arcuate spaces circumferentially spaced around the stator between the stator and the drum section, arcuate shaped wedges in the arcuate spaces, a Belleville spring coupled to the arm for pivoting therewith and a friction device in sliding contact with the Belleville spring and the wedges.

The tensioner, according to the first embodiment, is operable in first and second conditions. In the first operating condition, the friction device is engaged with the Belleville spring so as to pivot with the Belleville spring and the arm relative to the stator. In the second condition, the stator, wedges and friction device are locked-up together and the Belleville spring and the arm pivot relative to the friction device.

According to a second embodiment, a tensioner for a power transmission belt is provided having an arm including a belt engaging section and a drum section, a support member for securing the tensioner relative to the belt, and a spring that urges the arm to pivot about the support member in a first direction and urges the belt engaging section against the belt with a force to tension the belt. The tensioner also includes a stator coupled to the support member to form arcuate spaces, the arcuate spaces being circumferentially spaced around the stator between the stator and the drum section, arcuate shaped wedges located in the arcuate spaces, a friction device in sliding contact with the wedges and pivotable about the support member, and a Belleville spring coupled to the friction device for pivoting therewith, the Belleville spring also in sliding contact with the arm.

The tensioner, according to the second embodiment, is operable in first and second conditions. In the first condition, the Belleville spring is engaged with the arm such that the Belleville spring and friction device pivot with the arm relative to the stator. In the second condition, the stator, wedges and friction device are locked-up together and the arm pivots relative to the Belleville spring and friction device.

DETAILED DESCRIPTION

While the various features are hereinafter illustrated and described as providing a belt tensioner for a particular power transmission belt of a particular motor vehicle engine, it is to be understood that the various features can be utilized singly or in any combination thereof to provide a belt tensioner for other arrangements as desired. Therefore, the embodiments are not to be limited to only the embodiments illustrated in the drawings, because the drawings are merely utilized to illustrate one of the wide variety of uses of the tensioner.

Figures 1, 2A, 3:
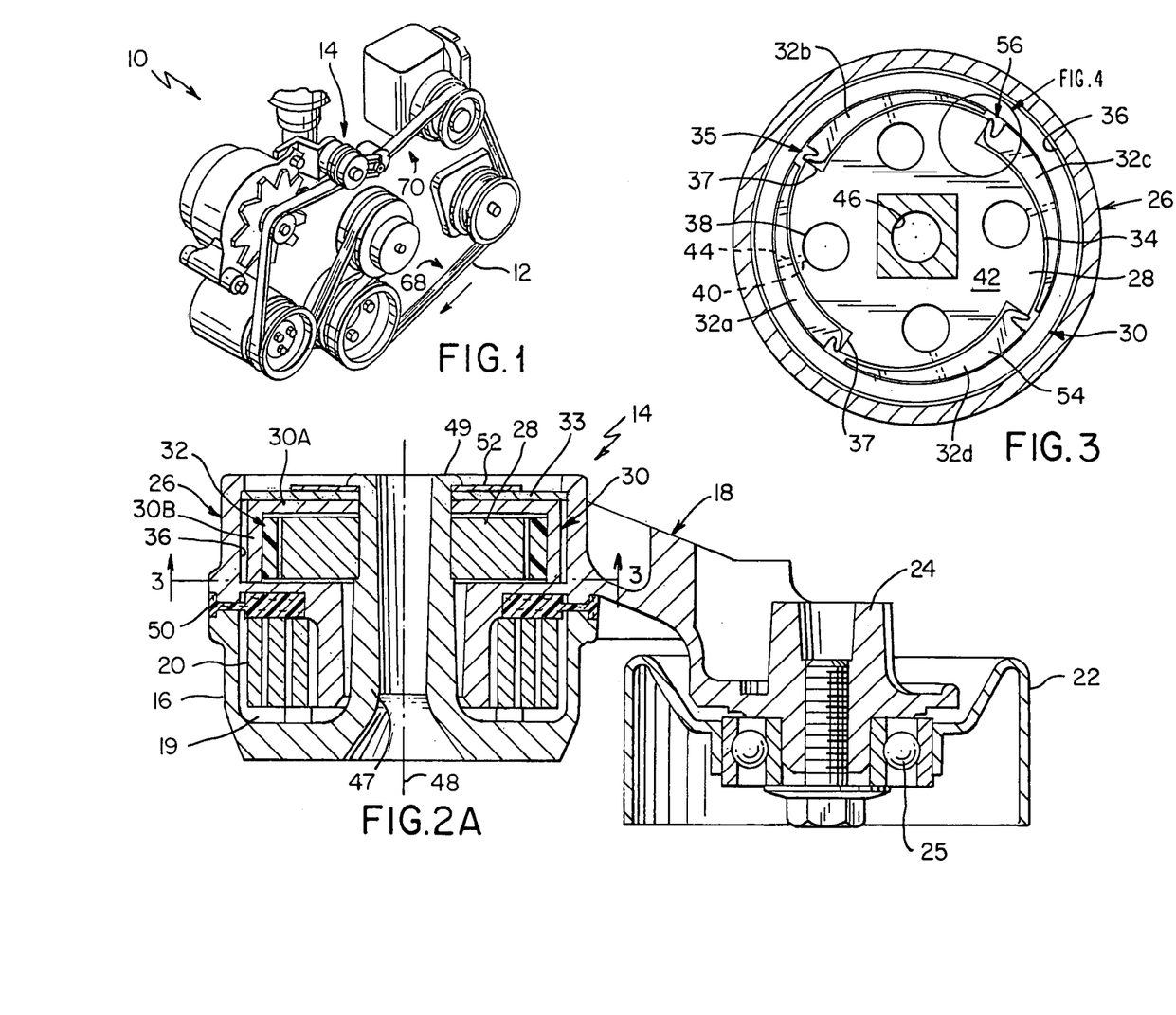
FIG. 1 is a perspective view of an automobile engine that utilizes the new belt tensioner.
FIG. 2A is a section view of the tensioner according to a first embodiment.
FIG. 3 is a section view looking into the tensioner at line 3—3 in FIG. 2.

Referring now to FIG. 1, an automobile engine is generally indicated by reference numeral 10 and utilizes an endless power transmission belt 12 for driving a plurality of driven accessories, as is well known in the art. The new belt tensioner is generally indicated by reference numeral 14 and is utilized to provide a predetermined tensioning force on the belt 12 in a manner hereinafter set forth. The endless power transmission belt 12 may be of any suitable type known in the art. Preferably, the belt 12 is made primarily of polymeric material because the unique features of the tensioner 14 readily permit the tensioner 14 to tension a belt having a load carrying cord in an effective manner as fully set forth in the aforementioned patent to Henderson, U.S. Pat. No. 4,596,538 whereby this U.S. Patent is being incorporated into this disclosure by reference.

Figure 2B:
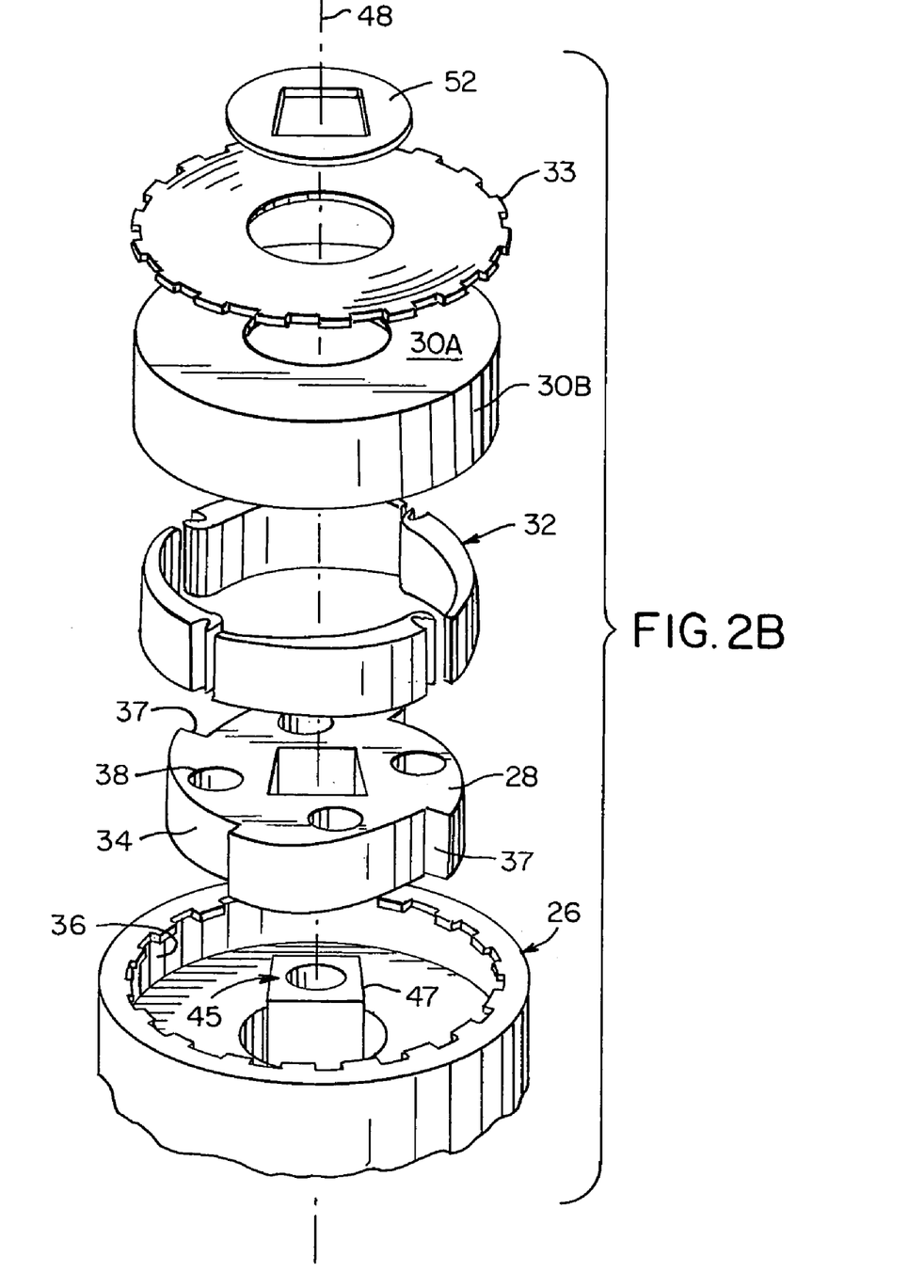
FIG. 2B is an exploded view of a section of the tensioner of FIG. 2A.

As best illustrated in FIGS. 2A–B, the new belt tensioner 14 according to a first embodiment comprises a support member 16 formed of any suitable polymeric material, which is fixed to a mounting bracket or support structure of the engine 10 by any known fastening devices extending through suitable apertures in the support member 16, as fully set forth in the aforementioned patent to Henderson, U.S. Pat. No. 5,443,424, whereby this U.S. Patent is being incorporated into this disclosure by reference. A belt engaging arm 18 is pivotably carried by the support member 16 in a manner hereinafter set forth, and may be die cast, permanent mold, sand cast, or investment cast of any suitable metallic material, such as aluminum or steel material.

The tensioner 14 further includes a housing 19 that houses a spring 20, where the spring 20 has an outer end that is operatively interconnected to the support member 16 and an inner end that is operatively interconnected to the belt engaging arm 18. In another embodiment, the inner end of the spring 20 may be connected to the support member 16 and the outer end may be connected to the arm 18. The spring 20 comprises a substantially flat, metallic member wound in a spiral manner to define spirals or coils, where an inner spiral is adjacent the inner end and an outer spiral is adjacent the outer end. The spring 20 has been wound up in such a manner that when it is disposed in the tensioner 14 of this invention, the spring 20 urges a belt engaging pulley 22 of the belt engaging arm 18 against the belt 12 to tension the same with a predetermined tension in a manner fully set forth in the above-mentioned patents. The spring may be a spiral flat cross section spring because it takes up less space in the tensioner, although other springs may be utilized, such as a helical coil round cross section, compression, or tension linear spring that, while less expensive, take up more room in the housing 19 because they have a longer barrel. The belt engaging pulley 22 is rotatably mounted to an end 24 of the arm 18 by suitable bearings 25 in a manner well known in the art.

Figure 4:
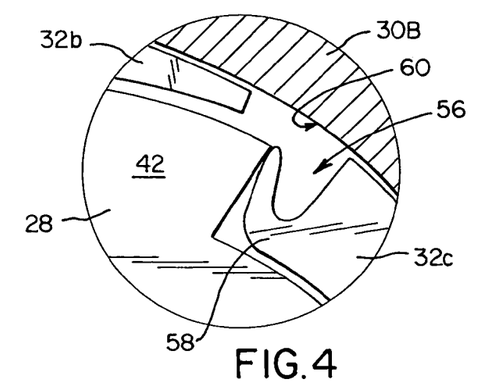
FIG. 4 is a zoomed view of a section of the tensioner as circled in FIG. 3 according to an embodiment.

Referencing FIGS. 3 and 4, with continuing reference to FIGS. 2A–B, the belt engaging arm 18 also includes a drum section 26, which forms a cavity with the support 16. Within the cavity is a stator 28, a friction device 30, wedges 32a–d, and a Belleville spring 33. The stator 28 includes an arcuate, stepped outside surface 34, which forms arcuate spaces or wedge pockets 35 between the outside surface 34 and the friction device 30. The stator 28 may be made of steel, aluminum or reinforced plastic, where the outside surface 34 of the stator 28 includes circumferentially spaced, radially inset steps 37.

The friction device 30 is comprised of a friction plate 30A and a friction plate annulus 30B that may be formed together or coupled together with glue, adhesive, or any other coupling material or system known in the art. The friction created between the friction device 30 and the wedges 32 generates a friction force that acts to resist movement of the arm 18. The friction plate 30A and the friction plate annulus 30B may be manufactured from aluminum or steel, or the like.

The wedges 32 are located within the arcuate spaces or wedge pockets 35, as discussed above, and are circumferentially limited in travel by the arcuate spaces or wedge pockets 35 in which they reside. The wedges 32 may be arcuate wedges, where the slope may be around 7–8 degrees, such that if the coefficient of friction is greater than around 0.126 the stator 28, wedges 32 and friction device 30 may lock-up together due to high friction generated therebetween. Lock-up occurs when adjacent parts stop moving relative to each other as a result of high friction. As described in more detail below, when the stator 28, wedges 32 and friction device 30 lock-up, the arm 18 may likewise lock-up due to high friction between the friction device 30 and the Belleville spring 33. Alternatively, if the friction between the friction device 30 and the Belleville spring 33 is overcome, the tensioner 14 will switch to a second operating condition. The wedges 32 may be made of reinforced plastic, thermoset phenolic, or brake pad organic thermoset material. It is to be appreciated that more or less than four wedges 32 may be used and all alternatives fall within the scope of the embodiments.

The Belleville spring 33, which may be formed as a washer with a slight conical shape in its free state, may be coupled to the drum section 26 along its outside circumference so as to pivot with the arm 18. When the center of the washer is pushed flush with the outside, i.e., when it is compressed and pressed flat, a force is created equal to the spring rate times the distance compressed. The force exerted by the Belleville spring 33 generates high friction between the Belleville spring 33 and friction plate 30A. In a first operating condition, this friction dominates and causes the friction device 30 to lock-up with the Belleville spring 33 and the arm 18 to which it is attached. In a second operating condition, when more external torque is applied to the tensioner, the Belleville spring 33 will pivot relative to the friction device 30 and thereby generate a frictional torque to resist movement of the arm 18. The Belleville spring 33 may be made of hardened steel so that it won't yield when it is flattened.

Lubricating passages 38 and 40 run through the stator 28. Lubricating passages 44 run through wedges. These lubricating passages are used to slow funnel lubrication to the wedge pocket 35 to allow for maintenance free operation. The stator 28 also has a elongated hole 46, centrally aligned along a longitudinal axis 48 of the tensioner 14, through which the hub 47 of the support member 16 is passed, such that the stator 28 is non-moveably secured to the hub 47. An upper section of the hub 47 may have a non-circular cross-section 45 to prevent pivoting of the stator 28. The parts are secured by section 49 of the hub 47, which holds a washer 52 against the other parts of the tensioner 14. Also, the arm 18 pivots around the hub 47.

Again with reference to FIGS. 2, 3, and 4, the tensioner further includes a bearing 50 that is located between the support member 16 and the drum section 26 adjacent the spring 20. The bearing 50 may be manufactured from high grade nylon with reinforcement for compressive and shear strength, and microscopic porosity to retain grease, as manufactured by DuPont and Dow.

Figure 5:
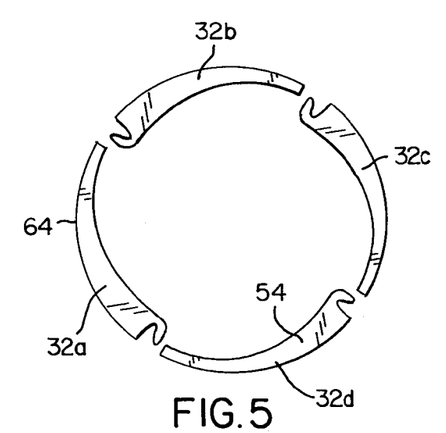
FIG. 5 is a top view of wedges of the tensioner as shown in FIGS. 2 and 3.

Now with reference to FIG. 4, a wedge spring 56 according to an embodiment is shown. The wedge spring 56 is integral with an end 58 of the wedge 32c, where all the wedges 32 have a similar wedge spring 56. The wedge spring 56 may be manufactured from nylon, or the like. The wedge spring 56 is utilized to bias or generate a separating force between the wedges 32 and the stator 28 and serves several purposes. First, the wedge springs 56 press the wedges 32 lightly against an inside surface 60 of friction plate annulus 30B, thereby achieving the proper wedge function by making the wedges 32 sensitive to arm rotation direction. Second, this outward pressure of the wedge spring 56 not only assures function, but also achieves a high level of responsiveness by having the wedge surfaces 64 (FIG. 5) already in contact, where the wedge surface 64 must engage during the high torque spring windup direction. This reduces the amount of rotational deflection that must occur during a transient belt event for the high tensioner resistance to occur. Third, as wear occurs on the wedge friction elements, the wedge springs 56 act as automatic wear compensators.

Figures 6A, 6B:
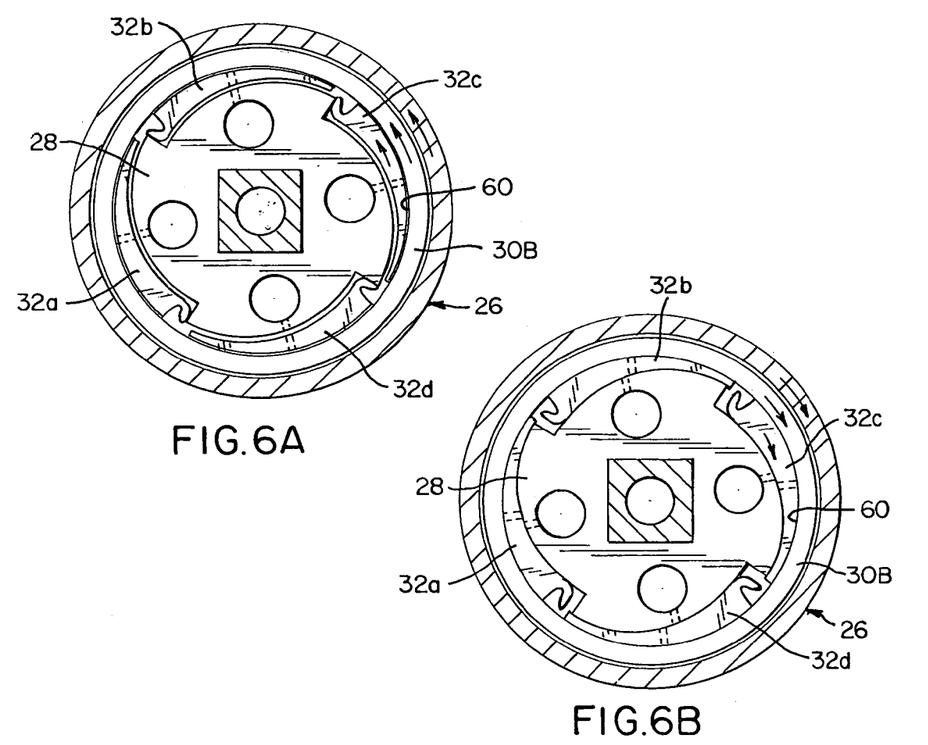
FIG. 6A is a view of a section of the tensioner during steady state operation.
FIG. 6B is a view of a section of the tensioner during non-steady state operation.

Referring to FIG. 6A, when the tensioner arm 18 rotates in a first direction toward the belt, the wedges 32 may lightly drag on and move with the inside surface 60 of the friction plate annulus 30B in the first direction. The wedges 32 do not lock-up in this direction because the friction force between surface 60 and wedge surface 64 pulls the wedges 32 opposite the wedging direction. In this condition, the tensioner 14 may exert around 80 lbs. at the pulley 22 due to torque generated by the spring 20.

As depicted in FIG. 6B, the arm 18 travels in an opposite, second direction, during, for example, a dynamic event that increases tension in the belt 12 causing the belt 12 to lift the arm 18. Examples of dynamic events include the unloading of an accessory, which may produce more tension in a slack span 68 (FIG. 1), or a rapid engine deceleration, which causes the inertia of one or more accessories to pull against an engine driver pulley through the belt 12 at a tensioner belt span 70 (FIG. 1). During such an event, it is desirable for the tensioner 14 to resist the lifting of the belt with a greater torque than is normally provided by the spring 20. Accordingly, when the arm 18 is moving in the second direction, away from the belt 12, the tensioner 14 is operable to generate frictional torques to supplement the torque exerted by the spring 20.

In a first operating condition, the friction device 30 is engaged with the Belleville spring 33 so as to pivot with the Belleville spring 33 and the arm 18. Specifically, the friction device 30 may be frictionally engaged with the Belleville spring 33 as a result of friction therebetween. Accordingly, the friction device 30 will continue to pivot with the Belleville spring 33 until the static friction force therebetween is overcome.

In the first operating condition, when the arm 18 moves in the second direction, the friction device 30 will pivot a small amount relative to the stator 28 and will drag the wedges 32 into frictional engagement with the stator 28 and the friction device 30. The friction forces generated between the stator 28, the wedges 32 and the friction device 30 will act to minimize movement of the arm 18 in the second direction, away from the belt 12. After pivoting only 3–5 degrees, the friction device 30 should lock up with the stator 28 and the wedges 32. If the lifting torque exerted by the belt 12 on the arm 18 is not great enough to overcome the static friction between the Belleville spring 33 and the friction device 30, then the arm 18 and the Belleville spring 33 will likewise remain locked-up to the friction device 30, which is in turn locked up to the wedges 32 and stator 28.

In a second operating condition, which occurs if more torque is applied by the belt 12 on the arm 18, the stator 28, wedges 32 and friction device 30 remain locked-up together and the Belleville spring 33 and the arm 18 pivot relative to the friction device 30. Specifically, the second operating condition occurs when the belt 12 exerts enough torque on the arm 18 to overcome the static friction between the Belleville spring 33 and the friction device 30. In this operating condition, sliding friction between the friction device 30 and the Belleville spring 33 will act to resist movement of the arm 18 in the second direction, away from the belt 12. The static friction force between the Belleville spring 33 and the friction device 30 may be selected to control the initiation of the second operating condition and thereby control the maximum tension that can be generated in the belt 12.

When the arm 18 of the tensioner 14 moves in the first direction, toward the belt 12, the tensioner 14 operates in the first condition. When the arm 18 of the tensioner 14 moves in the second direction, away from the belt 12, the tensioner 14 may operate in either the first or second operating condition. As soon as a dynamic event that causes the arm 18 to move in the second direction is over, the torque of the spring 20 generates sufficient motion of the arm 18 in the first direction to unlock or disengage the wedges 32 and the friction device 30 returning the tensioner 14 to the first operating condition.

Accordingly, the tensioner provides asymmetrical damping by generating greater frictional torques when the belt 12 tries to lift the tensioner arm 18 than when the tensioner arm 18 moves toward the belt 12. Essentially, there is no damping when the tensioner 14 moves toward the belt in a first friction mode. Furthermore, the tensioner allows for greater control of the damping by providing two distinct modes of operation. These principals and mechanisms of the tensioner can be applied to either dry friction elements or wet friction elements. Wet friction should result in more durability, similar to wet friction being used in automatic transmissions.

Figure 7:
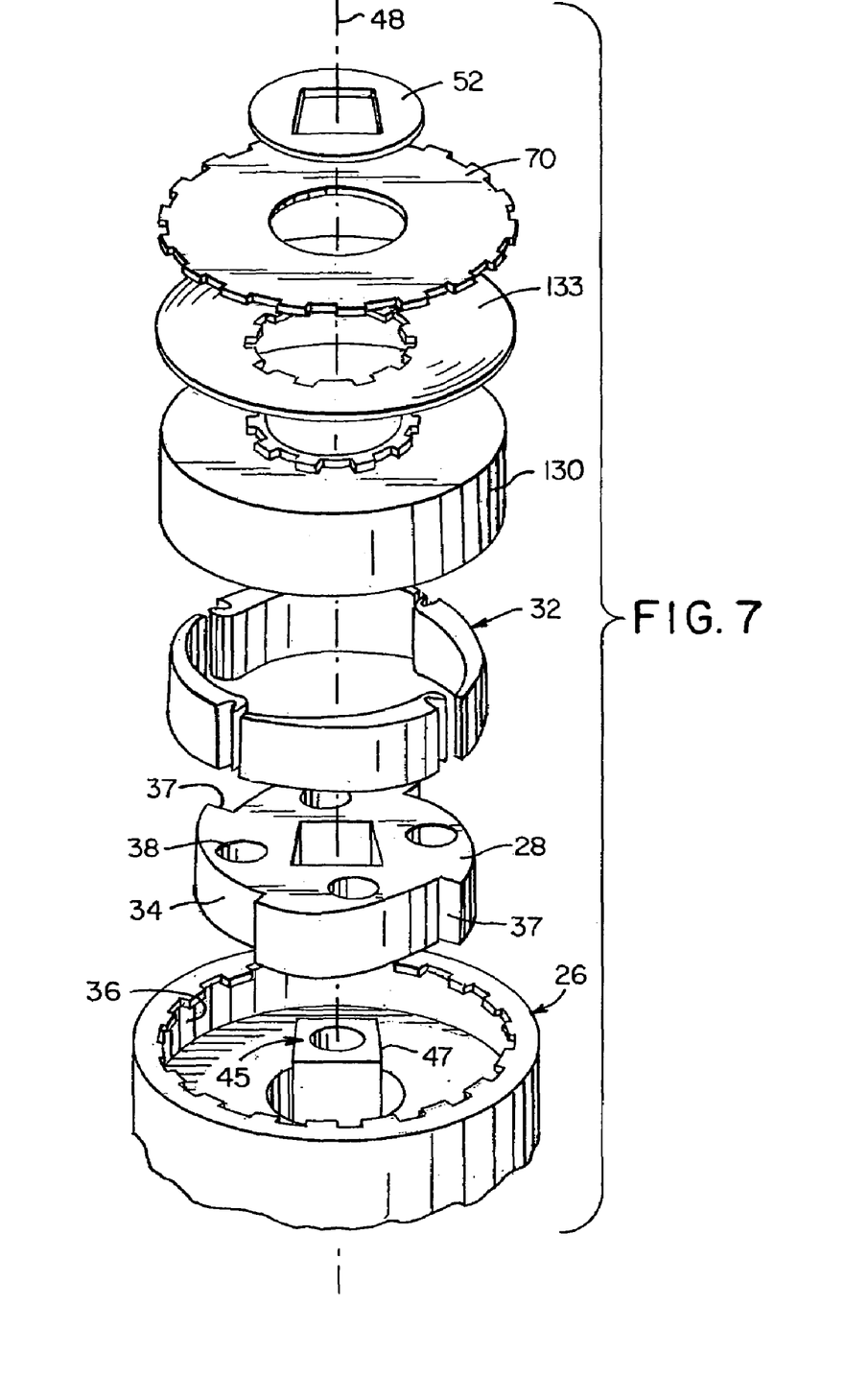
FIG. 7 is an exploded view of a tensioner according to a second embodiment.

In another embodiment, shown in FIG. 7, the Belleville spring 133 may be coupled to the friction device 130 for pivoting therewith. In this embodiment the arm 18 may further comprise an arm friction plate 70 that is in contact with the Belleville spring 133 and that is coupled to the drum section 26 of the arm 18 for pivoting therewith. According to this embodiment, in a first operating condition the Belleville spring 133 is engaged with the arm 18, specifically the arm friction plate 70, such that the Belleville spring 133 and friction device 130 pivot with the arm 18 relative to the stator 28. In a second operating condition, the stator 28, wedges 32 and friction device 130 are locked-up together and the arm 18 pivots relative to the Belleville spring 133 and friction device 130. Accordingly, this second embodiment is able to provide asymmetrical damping in substantially the same manner as the first embodiment using two distinct operating conditions and dual friction surfaces.

What is claimed is:

1. A tensioner for a power transmission belt that utilizes asymmetric motion control, the tensioner comprising:
   an arm comprising a belt engaging section and a drum section;
   a support member for securing the tensioner relative to the belt, the arm pivoting about the support member;
   a spring that urges the arm to pivot about the support member in a first direction and urges the belt engaging section against the belt with a force to tension the belt;
   a stator coupled to the support member to form arcuate spaces, the arcuate spaces being circumferentially spaced around the stator between the stator and the drum section;
   arcuate shaped wedges located in the arcuate spaces;
   a Belleville spring coupled to the arm for pivoting therewith; and
   a friction device in sliding contact with the Belleville spring and the wedges;
   wherein the tensioner is operable in a first condition in which the friction device is engaged with the Belleville spring so as to pivot with the Belleville spring and the arm relative to the stator and a second condition in which the stator, wedges and friction device are locked up together and the Belleville spring and the arm pivot relative to the friction device.

2. A tensioner as claimed in 1, wherein in the first operating condition the friction device is frictionally engaged with Belleville spring so as to pivot therewith.

3. A tensioner as claimed in claim 2, wherein the tensioner operates in the first operating condition when a lifting torque exerted by the belt on the arm is less than a frictional torque between the Belleville spring and the friction device.

4. A tensioner as claimed in claim 2, wherein the tensioner operates in the second operating condition when a lifting torque exerted by the belt on the arm is greater than a frictional torque between the Belleville spring and the friction device.

5. A tensioner as claimed in claim 1, wherein in the second operating condition sliding friction between the friction device and the Belleville spring acts to resist movement of the arm in the second direction.

6. A tensioner as claimed in claim 1, wherein the arm pivots in a second direction in the second operating condition.

7. A tensioner as claimed in claim 1, wherein the tensioner operates in the first condition when the arm pivots in the first direction and wherein the tensioner operates in one of the first and second conditions when the arm pivots in a second direction.

8. A tensioner as claimed in claim 1, wherein the tensioner operates in a first friction mode when the arm pivots in the first direction and wherein the tensioner operates in one of a second and third friction modes when the arm pivots in a second direction.

9. A tensioner as claimed in claim 8, wherein a friction force produced by the tensioner to resist movement of the arm is greater in the second and third friction modes than in the first friction mode.

10. A tensioner as claimed in claim 1, wherein the stator and wedges include fluid passageways for lubrication.

11. A tensioner as claimed in claim 1, wherein each of the wedges has a wedge spring configured to generate a separating force between each of the wedges and the stator.

12. A tensioner for a power transmission belt that utilizes asymmetric motion control, the tensioner comprising:
    an arm comprising a belt engaging section and a drum section;
    a support member for securing the tensioner relative to the belt, the arm pivoting about the support member;
    a spring that urges the arm to pivot about the support member in a first direction and urges the belt engaging section against the belt with a force to tension the belt;
    a stator coupled to the support member to form arcuate spaces, the arcuate spaces being circumferentially spaced around the stator between the stator and the drum section;
    arcuate shaped wedges located in the arcuate spaces;
    a friction device in frictional contact with the wedges and pivotable about the support member; and
    a Belleville spring coupled to the friction device for pivoting therewith, the Belleville spring also in frictional contact with the arm;
    wherein the tensioner is operable in a first condition in which the Belleville spring is engaged with the arm such that the Belleville spring and friction device pivot with the arm relative to the stator and a second condition in which the stator, wedges and friction device are locked-up together and the arm pivots relative to the Belleville spring and friction device.

13. A tension as claimed in claim 12, wherein in the first operating condition the Belleville spring is frictionally engaged with the arm so as to pivot therewith.

14. A tensioner as claimed in claim 12, wherein the tensioner operates in the first operating condition when a lifting torque exerted by the belt on the arm is less than a frictional torque between the Belleville spring and the arm.

15. A tensioner as claimed in claim 12, wherein the tensioner operates in the second operating condition when a lifting torque exerted by the belt on the arm is greater than a frictional torque between the Belleville spring and the arm.

16. A tensioner as claimed in claim 12, wherein in the second operating condition sliding friction between the Belleville spring and the arm acts to resist movement of the arm in the second direction.

17. A tensioner as claimed in claim 12, wherein the arm pivots in a second direction in the second operating condition.

18. A tensioner as claimed in claim 12, wherein the tensioner operates in the first condition when the arm pivots in the first direction and wherein the tensioner operates in one of the first and second conditions when the arm pivots in a second direction.

19. A tensioner as claimed in claim 12, wherein the stator and wedges include fluid passageways for lubrication.

20. A tensioner for a power transmission belt that utilizes asymmetric motion control, the tensioner comprising:
an arm comprising a belt engaging section and a drum section;
a support member for securing the tensioner relative to the belt, the arm pivoting about the support member;
a spring that urges the arm to pivot about the support member in a first direction and urges the belt engaging section against the belt with a force to tension the belt;
a stator coupled to the support member inside the drum section of the arm to form arcuate spaces, the arcuate spaces being circumferentially spaced around the stator between the stator and the drum section;
arcuate shaped wedges located in the arcuate spaces;
a Belleville spring coupled to the arm for pivoting therewith; and
a friction device in sliding contact with the Belleville spring and the wedges;
wherein the stator and wedges include fluid passageways for lubrication.

21. A tensioner for a power transmission belt that utilizes asymmetric motion control, the tensioner comprising:
an arm comprising a belt engaging section and a drum section;
a support member for securing the tensioner relative to the belt, the arm pivoting about the support member;
a spring that urges the arm to pivot about the support member in a first direction and urges the belt engaging section against the belt with a force to tension the belt;
a stator coupled to the support member inside the drum section of the arm to form arcuate spaces, the arcuate spaces being circumferentially spaced around the stator between the stator and the drum section;
arcuate shaped wedges located in the arcuate spaces;
a friction device in frictional contact with the wedges and pivotable about the support member; and
a Belleville spring coupled to the friction device for pivoting therewith, the Belleville spring also in frictional contact with the arm;
wherein the stator and wedges include fluid passageways for lubrication.

\* \* \* \* \*